Jan. 26, 1960
F. N. BAUMGARTNER
TWO-STREAM PROCESS OF PREPARING
HYDROCARBON OIL THICKENING SOAP
Filed Oct. 22, 1956
2,922,799
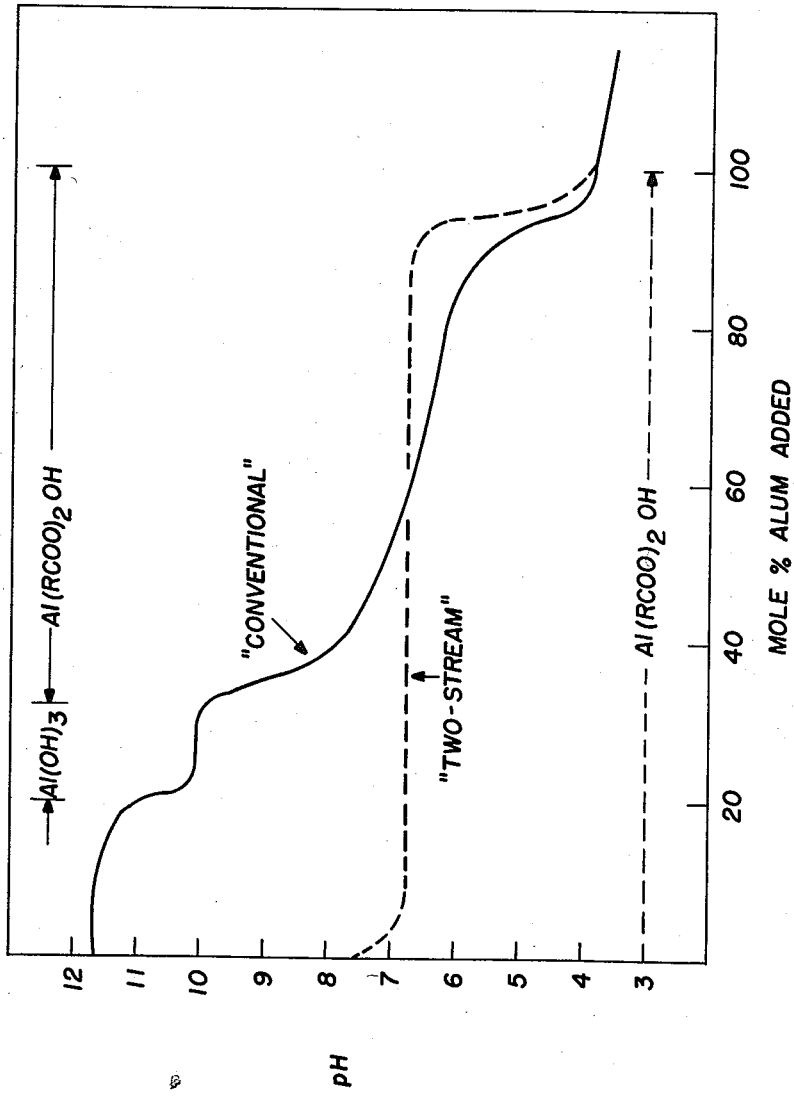
Frederick N. Baumgartner  Inventor
By Henry Berk  Attorney

United States Patent Office 2,922,799
Patented Jan. 26, 1960

2,922,799

TWO-STREAM PROCESS OF PREPARING HYDROCARBON OIL THICKENING SOAP

Frederick Neil Baumgartner, Plainfield, N.J., assignor to Esso Research and Engineering Company, a corporation of Delaware Application October 22, 1956, Serial No. 617,654

10 Claims. (Cl. 260—414)

This invention is concerned with a process for preparing aluminum soaps of aliphatic or fatty acids for hydrocarbon oil thickening purposes.

An object of this invention is to prepare the aluminum soap thickeners having distinctively superior properties for meeting physical and chemical requirements of high standards for fuel thickeners.

A further object is to provide a novel "two-stream" procedure for preparing the aluminum soap with minimized formation of undesirable end products.

A further object is to provide a procedure of controlling the aluminum soap formation through the manner of admixing the reactants and controlling acidity, whereby a substantially improved product is obtained, not only in meeting the usual requirements, but also in having a more diversified use in thickening light and heavy hydrocarbon fuel fractions.

In the known and earlier common methods of preparing the aluminum soaps of organic acids for hydrocarbon thickening purposes, an aluminum salt solution, e.g. aqueous solution of aluminum sulfate, aluminum chloride, aluminum acetate, or other water-soluble aluminum salt is added to an aqueous solution of the sodium salt of the fatty or aliphatic carboxylic acid or mixtures thereof. In these preparations, a 50% excess of caustic over that required to neutralize the fatty acid reactant material is necessary to complete the reaction, and commonly this amount of caustic has been used at the beginning of the reaction with the fatty acid material, represented by RCOOH.

The overall reaction considered to represent the preparation of the salt is as follows:

$$Al_2(SO_4)_3 + 6NaOH + 4RCOOH \rightarrow$$
$$2Al(OH)(OOCR)_2 + 3Na_2SO_4 + 4H_2O$$

It is apparent from the above equation that the original sodium hydroxide would contain an excess of the caustic or free sodium hydroxide. Thus, as the aluminum salt solution, e.g. aluminum sulfate, referred to as "alum" begins to be added, the initial reaction is between the aluminum salt and the caustic to form aluminum hydroxide. The aluminum hydroxide, being insoluble, precipitates from the solution. When the excess caustic has been consumed, the formation of the aluminum disoap begins. Finally, the aluminum hydroxide tends to react with free acid formed during the soap making reaction.

The foregoing steps may be represented as involving reactions indicated by the following equations occurring generally in the order listed:

(1a) $$Al^{+++} + OH^- \rightarrow Al(OH)_3$$

(2a) $$Al^{+++} + 2RCOONa + H_2O \rightarrow$$
$$Al(OH)(OOCR)_2 + RCOOH + 2Na^+$$

(3a)
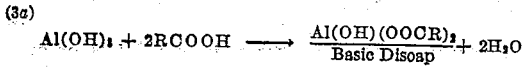

R is the $C_1$–$C_{35}$ aliphatic hydrocarbon radical of a $C_2$–$C_{36}$ aliphatic carboxylic acid.

From results that have been obtained, it appears that unfortunately the above step (3a) occurs very slowly. There is evidence that the final product tends to contain in addition to the desired disoap varying amounts of the aluminum hydroxide depending on the completeness of reaction (3a). Also, the product may contain varying amounts of free or unsaponified fatty acids remaining unreacted for the same reason.

In the usual preparations of aluminum salts of the fatty acids for thickening purposes, the products have varied considerably in aluminum hydroxide and free fatty acid content depending on the equipment and the operator. The products of these older procedures, while usually acceptable, have been frequently poor and have presented difficulties in reproducibility.

The present invention is concerned with a method of preparation which substantially eliminates the formation of aluminum hydroxide, i.e. eliminates the initial step of the conventional procedure. Thereby, the undesirable reactions between aluminum hydroxide and free fatty acid is obviated. This is accomplished by beginning the preparation at about 0% excess caustic in the reaction mixture; in other words, by first supplying only enough caustic or sodium hydroxide for neutralizing the fatty acids before the aluminum salt is brought into the reaction mixture. Thus, the alkalinity of the reaction mixture can be controlled to start with by keeping the mixture at a pH level near 7, i.e. below 10, e.g. between 6 and 8, before starting the addition of the aluminum salt. In the earlier methods commonly used, the pH of the reaction mixture is of the order of 10 to 12 when the aluminum salt addition is started.

In using the process of the present invention, the formation of aluminum hydroxide is substantially prevented in that as the aluminum solution is added the pH conditions are such as to prevent the initial reaction (1a) from occurring and rather reaction (2a) becomes the initial and principal reaction for the formation of the soap with release of fatty acid. If the aluminum salt is added by itself the pH begins to fall, but by taking the proper care to add a separate stream containing the necessary excess caustic, i.e. the amount of caustic above that needed for neutralizing the free fatty acid in the aqueous solution, with the rate adjusted the pH of the reaction mixture can be kept from falling too low and from rising too high, i.e. preferably in the range of about 6 to 8 for effecting and completing the reaction (2a). In this way the released free fatty acid is neutralized, forming sodium soap which reacts with the aluminum salt to form the desired aluminum disoap. The reactions which occur in accordance with the present process can be more aptly represented as follows:

(1b) $$Al^{+++} + 2RCOONa + H_2O \rightarrow$$
$$Al(OH)(OOCR)_2 + RCOOH + 2Na^+$$

(2b) $$RCOOH + NaOH \rightarrow RCOONa + H_2O$$

In this new system, the slow reaction between $Al(OH)_3$ and the free fatty acid RCOOH is eliminated. This is borne out by the fact that the resulting product does not contain $Al(OH)_3$ to any appreciable extent and contains very little free fatty acid. Thus the aluminum disoap prepared is of higher purity and may even be considered of better versatility especially with respect to gelling of a wider range of fuels than can be obtained with the ordinary type of aluminum soap prepared from the same kind of fatty acids but by the older method.

The improved method of the present invention is designated as the "two-stream" method since it involves simultaneous addition of the aqueous aluminum salt solution as one stream and of the aqueous caustic solution as a second stream to the reaction mixture containing the soaps of the organic acid which is to be reacted. The reaction mixture is maintained from the beginning up to near the end of the reaction at a pH close to 7, usually between 6 and 8. In distinct contrast the conventional method which starts with an addition, first, of excess caustic to the fatty acid soap followed by addition of the aqueous aluminum salt solution, a wide variation in the pH occurs starting with a pH of about 12. Only at some instant in the conventional method is the reaction mixture close to a pH of 7. At the end of the reactions in either method the pH finally becomes lowered to about 3.5. The contrast between the two-stream and conventional methods are illustrated by the titration curves in the drawing.

It will be noted that in the two-stream method the pH is close to 7 from the beginning of the addition of the alum solution to near the completion of the disoap formation as where the reaction is about 80 to 95% complete. In the conventional method at the beginning of the reaction there is a high excess of caustic followed by a distinct period (about 60% of completion) in which aluminum hydroxide formation is shown at a pH above 7 and this is followed by the descending pH values from about a pH of 10 to a pH of 3.5.

Examples of the preparation, analyses, and evaluation of the products follow:

EXAMPLE 1

2-ethyl hexoic acid _____ 3.0 moles.
NaOH _____ 3.0 moles (0% excess).
H₂O _____ 4243 grams.

The above mixture (10% sodium soap) was heated to 35° C. (pH 7.4). A solution of alum was added slowly with stirring.

Al₂(SO₄)₃·18H₂O _____ 0.86 mole (15% excess).
H₂O _____ 1560 grams.
(2.18% aluminum solution)

In 5 minutes approximately 170 ml. alum had been added and the pH had fallen to 6.8. A solution of NaOH was added slowly continuing the alum addition without interruption.

NaOH _____ 1.5 moles (50% excess required).
H₂O _____ 150 grams.

The caustic stream was adjusted to maintain pH between 6 and 8 during the entire operation. Temperature remained 35±1° C. throughout. The pH dropped at equivalence point (100% alum) and at end point (115% alum) was 3.65. Time was 43.5 min. The reaction mixture was stirred an additional 10 minutes, filtered in a basket-centrifuge, washed with 18 liters of water, dried to 0.30% moisture in a forced draft oven at 48° C., ground through a 1/16" herringbone screen in a micropulverizer, and packaged. A prior conventional preparation is the same as described above except the 1.50 moles caustic (50% excess) is added to the original sodium soap mixture at the start. There is no separate caustic stream. The initial pH in this case is about 12 and falls to pH 7.0 after approximately 50% of the alum has been added.

Those skilled in the art will understand the measurements used in determining the desirable physical properties of the disoaps with relation to their utility for thickening hydrocarbon liquids. Important tests are the following:

Vortex time—Measurement of time in minutes for thickening of a given hydrocarbon liquid to a point where settling of the soap will not occur.

Gel time—Time in hours for setting of the hydrocarbon gel.

Gel strength—Gardner Mobilometer measure of consistency and viscosity using sufficient weight (grams) to cause a plunger to penetrate a certain distance into the gel in a certain time (100 seconds).

Evaluations were made of the products prepared using the improved two stream method and of products formed from the same reactants using prior or conventional methods. Results from the evaluations are tabulated in the following tables:

TABLE I.—EVALUATION

*Two-stream versus conventional aluminum disoap preparation*

ALUMINUM DI-2-ETHYLHEXANOATE

|  | Present Two-Stream Method | Prior Conventional Method | Conventional Commercial Product |
|---|---|---|---|
| Percent H₂O | 0.30 | 0.40 | 0.40 |
| Percent Aluminum Disoap | 98.6 | 96.4 | 96.8 |
| Percent Free Fatty Acid | 0.15 | 0.31 | 0.31 |
| Vortex, min | 2:08 | 2:55 | 100:00 |
| Gel, hrs | 3.0 | 6 to 22 | 8 to 24 |
| Gel Consistency, g. Gardner @ 100 secs.: | | | |
| 2% (150° F.) | 230 | 150 | 220 |
| 1.2% (77° F.) | [1] 190–220 | [1] 250–210 | [1] 200–270 |
| 1.0% (77° F.) | [1] 30–110 | [1] 30–120 | 30 |

[1] Second value indicates gel strength after 1 week of gel aging.

TABLE II.—EVALUATION

*Two-stream versus conventional aluminum disoap preparation*

ALUMINUM DIISOOCTANOATE

|  | Two-Stream | Prior Conventional | Conventional Commercial |
|---|---|---|---|
| Percent H₂O | 0.30 | 0.45 | 0.75 |
| Percent Aluminum disoap | 93.4 | 88.2 | 88.7 |
| Percent Free fatty acid | 1.4 | 3.8 | 1.4 |
| Vortex, min | 1:22 | 1:01 | 4:57 |
| Gel, hrs | 0.25 | 0.5 | 0.25 |
| Gel Consistency, g. Gardner @ 100 secs.: | | | |
| 4% (150° F.) | 430 | 320 | 370 |
| 4% (75° F.) | 530 | 360 | 450 |
| 2% (75° F.) | 220 | 190 | 220 |

NOTE.—Products contain 3% Santocel as an antiagglomerate.[1]

4% (150° F.)=4% Al disoap in test solvent (gasoline). 24± hrs. @ 150° F.
4% (75° F.)=4% Al disoap in test solvent (gasoline). 24± hrs. @ 75° F.
2% (75° F.)=2% Al disoap in test solvent (gasoline). 24± hrs. @ 75° F.

[1] Dehydrated silica gel.

The visible significant advantages of the product prepared by the present method are the low vortex time despite low moisture, very low gelling time, and the high gel strength or consistency as compared to an aluminum soap prepared from the same kind of organic acid using the prior method. In the present instance the acid employed was 2-ethyl hexoic acid.

Similar advantages are obtainable in preparing the aluminum soaps of other organic acids which react with aluminum salts to form the oil thickening aluminum soap compounds. In general, these acids include C₂ to C₃₆ acids and mixtures of their isomers e.g. the acids formed by oxidation of C₈ aldehydes formed by the Oxo process, or acids formed by caustic fusion of C₇ to C₁₈ alcohols commercially available as oxonation products or from other methods of manufacturing.

Any of the organic carboxylic acid useful for preparing disoaps of aluminum which act as hydrocarbon thickeners may be used. These organic acids include aliphatic carboxylic acids such as heptoic, caprylic, mixed octoic acids, capric, lauric, palmitic, stearic, oleic, linoleic, dimerized linoleic, and naphthenic acids, also, other homologous or analogous acids.

In the disoap forming reaction other caustic solutions may be used in place of caustic soda, e.g. KOH or ammonium hydroxide, but the preferred alkali or caustic solution is a NaOH solution. The terms alkali and caustic are intended to include the hydroxides of Na, K, and $NH_4$.

The aluminum or aluminum salt used in the disoaps may be various aluminum salts which will react readily in the disoap reactions including more commonly in addition to aluminum sulfate, the chloride, nitrate and acetate salts forming suitable aqueous solutions.

In using the present method the initial soap and aqueous solution thereof may be prepared in any desired manner of saponification.

To the aqueous soap solution are added the two streams, that is the alum or aluminum salt and the caustic stream, and these two streams can be added in proper proportions with respect to the organic acid soap of the organic acid for arriving at the final basic aluminum disoap product with the highly favorable control of the pH which leads to the improved product.

It is to be noted that the amount of caustic solution added is in the stoichiometric proportion which is half the molar quantity of the organic carboxylic acid in the alkali metal soap used as the starting material. Thus, the caustic addition can be controlled so that the caustic is present to neutralize free organic acid as it is being formed without forming any substantial amount of aluminum hydroxide. As the aluminum salt is added it reacts with the alkali metal soap present to directly form the basic disoap of aluminum. Thus, at any time during this reaction there is very little aluminum hydroxide or free organic acid present. Thus, with ease of control the result is a high purity product, reproducibility of the product and the favorable properties described.

In general, the "two-stream" procedure can be operated satisfactorily over a wide range of variations in process variables. Optimum reaction temperatures in test operations were 25° C. but higher and lower temperatures may be used. Variations in addition rates, degrees of agitation, method of agitation and aluminum salt had minor effects on product quality. Precipitations were carried out first in reaction mixtures having a pH of 6.5 to 7.0 and then it was learned that the rate of alum addition could be varied without undesired effects. At a pH in the range of 7 to 8 or better at 7.5 in the reaction mixture a finer control of the rates of the two streams, alum and caustic, could be achieved.

Another distinctive feature of the presently described two-stream process, resides in the addition of the aluminum salt and alkali to the preformed aqueous solution of an alkali soap of fatty acid so that initially and throughout the following reaction the reaction mixture has a pH below 10 to eliminate formation of $Al(OH)_3$ which would occur at a pH above 10, as illustrated in the drawing. The fatty acid may be a single fatty acid or a mixture of fatty acids, e.g. 2-ethylhexoic acid, an isooctoic acid, or a mixture of octoic acids, e.g. isooctoic acid in a mixture of octoic acids which are obtained from the known oxo process.

What is claimed is:

1. A process for the preparation of a basic aluminum disoap of an aliphatic carboxylic acid having 2–36 carbon atoms which comprises simultaneously adding to a substantially neutral aqueous solution of a soap selected from the group consisting of sodium, potassium and ammonium soaps of said carboxylic acid, a solution of a water soluble aluminum salt and an aqueous solution of a hydroxide selected from the group consisting of sodium, potassium and ammonium hydroxides, for a period during which the aluminum disoap of the acid is formed while the thus admixed solutions are kept at a pH between 6 and 8.

2. A process for preparing a basic aluminum disoap of an aliphatic carboxylic acid having 2–36 carbon atoms which comprises simultaneously adding to a substantially neutral aqueous solution of a soap selected from the group consisting of sodium, potassium and ammonium soaps of said carboxylic acid, a solution of a stream of a water soluble aluminum salt and as a separate second stream, an aqueous solution of a hydroxide selected from the group consisting of sodium, potassium and ammonium hydroxides for a period during which a basic aluminum disoap of the aliphatic carboxylic acid is formed.

3. The process of claim 2, wherein the amount of aluminum salt added is sufficient to form the disoap of the organic acid and the amount of sodium hydroxide by the caustic solution is about half the molar quantity of the organic acid in sodium soap.

4. The process of claim 2 wherein the addition of the aluminum salt and the sodium hydroxide solution during the disoap formation is controlled to maintain the resulting reaction mixture at a pH of from about 6 to 8 until all the sodium hydroxide has been added.

5. The process of claim 2, wherein the addition of caustic and the addition of the aluminum salt are regulated so that the resulting reaction mixture has a pH in the range of 6 to 8 when the reaction is at 80 to 95% of completion.

6. A process for the preparation of a basic aluminum disoap useful for thickening a hydrocarbon liquid, which comprises forming an aqueous solution of a soap selected from the group consisting of sodium, potassium, and ammonium soaps of a $C_2$–$C_{36}$ aliphatic carboxylic acid, said solution having a pH in the range of 6 to 8, adding thereto aqueous solutions of an aluminum salt and of a hydroxide selected from the group consisting of sodium, potassium, and ammonium hydroxides, in controlled amounts to keep the resulting reaction mixture at a pH in the range of 6–8 until 80 mol % of the aluminum salt solution has been added to precipitate the basic aluminum disoap of said aliphatic carboxylic acid.

7. The process of claim 6, in which the pH of the resulting reaction mixture is maintained close to 7.5 until at least 80 mole % of the aluminum salt is added, after which the remaining 20 mole % of said salt needed is added to complete the reaction.

8. The process of making a basic aluminum disoap useful for thickening a hydrocarbon liquid, which comprises forming an aqueous solution of an alkali soap of fatty acid having 8 carbon atoms per molecule, said solution having a pH below 10, and adding to said solution aluminum salt and alkali to bring about formation of the disoap in the resulting reaction mixture at a pH below 10.

9. The process of claim 8, wherein the fatty acid is 2-ethylhexoic acid.

10. The process of claim 8, wherein the fatty acid is isooctoic acid in a mixture of octoic acids.

References Cited in the file of this patent

UNITED STATES PATENTS

| | | |
|---|---|---|
| 2,420,233 | Edwards | May 6, 1947 |
| 2,447,064 | Gebhart | Aug. 17, 1948 |